United States Patent
Ghosh et al.

(10) Patent No.: US 10,083,169 B1
(45) Date of Patent: Sep. 25, 2018

(54) TOPIC-BASED SEQUENCE MODELING NEURAL NETWORKS

(71) Applicant: Google LLC, Mountain View, CA (US)

(72) Inventors: Shalini Ghosh, Redwood City, CA (US); Oriol Vinyals, London (GB); Brian Patrick Strope, Palo Alto, CA (US); Howard Scott Roy, Palo Alto, CA (US); Thomas L. Dean, Los Altos Hills, CA (US); Larry Paul Heck, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/248,966

(22) Filed: Aug. 26, 2016

Related U.S. Application Data (60) Provisional application No. 62/211,636, filed on Aug. 28, 2015.

(51) Int. Cl.
*G10L 15/00* (2013.01)
*G06F 17/27* (2006.01)
*G06N 3/08* (2006.01)
*G06N 3/04* (2006.01)

(52) U.S. Cl.
CPC ........ *G06F 17/276* (2013.01); *G06F 17/2775* (2013.01); *G06N 3/04* (2013.01); *G06N 3/088* (2013.01)

(58) Field of Classification Search
None
See application file for complete search history.

(56) References Cited

U.S. PATENT DOCUMENTS

| | | | | |
|---|---|---|---|---|
| 6,178,396 B1* | 1/2001 | Ushioda | ............... | G06F 17/2715 704/1 |
| 9,805,371 B1* | 10/2017 | Sapoznik | ............. | G06Q 30/016 |
| 2006/0020473 A1* | 1/2006 | Hiroe | .................... | G10L 13/027 704/275 |
| 2007/0055496 A1* | 3/2007 | Seto | ...................... | G06F 17/277 704/9 |
| 2011/0246076 A1* | 10/2011 | Su | ......................... | G06F 17/278 702/19 |

(Continued)

OTHER PUBLICATIONS

Graves, "Supervised Sequence Labelling with Recurrent Neural Networks," vol. 385 of Studies in Computational Intelligence, Springer 2012 [online] (retrieved from https://www.cs.toronto.edu/~graves/preprint.pdf), 137 pages.

*Primary Examiner* — Marcus T Riley
(74) *Attorney, Agent, or Firm* — Fish & Richardson P.C.

(57) ABSTRACT

Methods, systems, and apparatus, including computer programs encoded on computer storage media, for processing word sequences using neural networks. One of the methods includes receiving a first sequence of words arranged according to a first order; and for each word in the first sequence, beginning with a first word in the first order: determining a topic vector that is associated with the word; generating a combined input from the word and the topic vector, and processing the combined input through one or more sequence modeling layers to generate a sequence modeling output for the word; and processing one or more of the sequence modeling outputs through an output layer to generate a neural network output for the first sequence of words.

15 Claims, 3 Drawing Sheets

(56) References Cited

U.S. PATENT DOCUMENTS

| | | | |
|---|---|---|---|
| 2012/0150532 A1* | 6/2012 | Mirowski | G06F 17/28 |
| | | | 704/9 |
| 2016/0071526 A1* | 3/2016 | Wingate | G10L 21/028 |
| | | | 704/233 |
| 2017/0053646 A1* | 2/2017 | Watanabe | G10L 15/1822 |
| 2017/0076196 A1* | 3/2017 | Sainath | G06N 3/04 |

* cited by examiner

TOPIC-BASED SEQUENCE MODELING NEURAL NETWORKS

CROSS-REFERENCE TO RELATED APPLICATION

This application claims priority to U.S. Provisional Application No. 62/211,636, filed on Aug. 28, 2015. The disclosure of the prior application is considered part of and is incorporated by reference in the disclosure of this application.

BACKGROUND

This specification relates to processing word sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short-term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to processing word sequences using neural networks.

Generally, a sequence processing system generates a neural network output for a received word sequence by, for each word in the word sequence, determining a topic vector for the word and generating a combined input from the word and the topic vector. The sequence processing system then processes the combined input through one or more sequence modeling layers to generate a sequence modeling output for the word and generates the neural network output for the word sequence by processing one or more of the sequence modeling outputs through an output layer.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. A sequence processing neural network system that considers topics for words in input word sequences can achieve a significant performance benefit on many natural language (NL) tasks. For example, such a system can be used for a wide variety of NL applications, like question answering, sentence completion, paraphrase generation, and next utterance prediction in dialog systems. Additionally, some of the sequence modeling neural network systems can learn the topic for words in input word sequences in an unsupervised manner, i.e., instead of using supervised extraneous topics as additional inputs that are required to be received or maintained by the system in order to process a word sequence. This can reduce the computational complexity of the system and reduce latency in responding to user requests, i.e., because the system does not have to maintain or receive topic data for words and instead can generate the topics during the processing of the words sequence.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
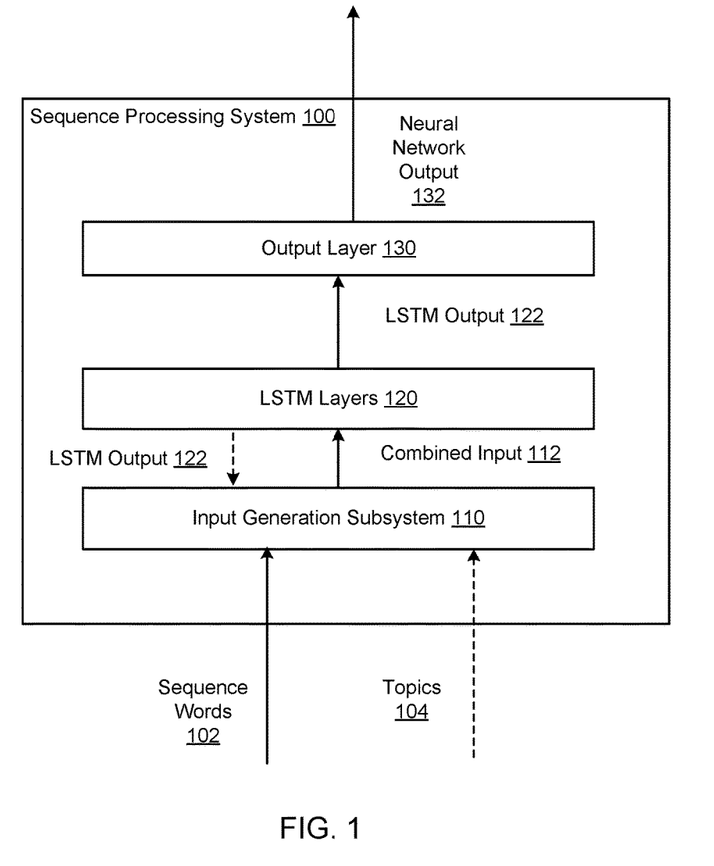
FIG. 1 shows an example sequence processing system.

FIG. 1 shows an example sequence processing system 100. The sequence processing system 100 is an example of a system implemented as computer programs on one or more computers in one or more locations in which the systems, components, and techniques described below are implemented.

The sequence processing system 100 receives an input word sequence 102 that includes multiple words and generates a neural network output 132 for the word sequence 102. Generally, the word sequence 102 is an ordered collection of words. In some cases, the word sequence 102 includes multiple sentences of words in the order in which those sentences appear in a source text.

The sequence processing system 100 can be configured to generate any of a variety of different kinds of neural network outputs for a given word sequence. That is, the sequence processing system 100 can be configured to perform any of a variety of natural language processing tasks, and the neural network output generated by the sequence processing system 100 will be an output that is appropriate for the task that the sequence processing system 100 is configured to perform.

In one example, the sequence processing system 100 is configured to perform a word prediction task in which, given the words in the word sequence 102, the sequence processing system 100 predicts the most likely next word, i.e., the word that is most likely to immediately follow the last word in the sequence 102 in a source text. In this example, the neural network output 132 includes a respective next word score for each vocabulary word in a vocabulary of words. The respective next word score for each vocabulary word represents a likelihood that the vocabulary word is the word that immediately follows the last word in the sequence in the source text.

In another example, the sequence processing system 100 is configured to perform a sentence topic prediction task in which, given the word sequence 102 that includes one or more sentences, the sequence processing system 100 predicts the topic of the next sentence, i.e., of a sentence that would immediately follow the last sentence in the sequence 102 in a source text. In this example, the neural network output 132 includes a respective next topic score for each topic in a predetermined set of topics. The respective next topic score for each of the topics in the set represents a likelihood that the topic is the topic of a sequence of words that immediately follows the sequence 102 in the source text.

In another example, the sequence processing system 100 is configured to perform a next sentence selection task in which, given a current sequence of one or more sentences, the sequence processing system 100 predicts the most likely next sentence, i.e., the sentence that is most likely to follow the last sentence in the current sequence, from a set of candidate next sentences.

In this example, the word sequence 102 is made up of the current sequence followed by one of the candidate next sentences in the set of candidate next sentences. The neural network output 132 generated by the sequence processing system 100 for the word sequence 102 is a next sentence score that represents a likelihood that the candidate next sentence in the word sequence 102 would follow the current sequence in a source text.

In this example, to determine the sentence in the set of candidate next sentences that is the most likely next sentence, the sequence processing system 100 can generate a respective next sentence score for each candidate next sentence by, for each candidate next sentence, processing a respective word sequence that includes the current sequence followed by the candidate next sentence. The sequence processing system 100 can then select the sentence in the set that has the highest next sentence score as the most likely next sentence.

The sequence processing system 100 includes an input generation subsystem 110, one or more long-short term memory (LSTM) neural network layers 120, and an output layer 130.

For each word in the word sequence 102, the input generation subsystem 110 is configured to generate a combined input from the word and a topic vector for the word.

A topic vector for a word is a numeric representation of the topic of a text segment to which the word belongs. For example, a text segment describing a cat may have as its topic vector a vector that maps to the word "cat."

As will be described in more detail below with reference to FIG. 3, in some implementations, the input generation subsystem 110 uses the same topic vector for all of the words in the word sequence 102. In some other implementations, when the word sequence 102 includes more than one sentence, the input generation subsystem 110 uses the same topic vector only for all of the words in the same sentence within the word sequence 102.

In some implementations, the input generation subsystem 110 receives as input topics 104 or topic vectors as determined by an external system and uses the received topics 104 or topic vectors in generating combined inputs.

In some other implementations, the input generation subsystem 110 uses LSTM outputs, e.g., an LSTM output 122, generated by the one or more LSTM layers 120 to generate topic vectors for words in the word sequence 102, i.e., without needing to receive topic data from an external system.

Generating a topic vector for a given word in an input word sequence and using the topic vector to generate a combined input are described in more detail below with reference to FIG. 3.

For each word in the word sequence 102, the LSTM layers 120 are configured to receive the combined input generated by the input generation subsystem 110 for the word and to process the combined input in accordance with a current hidden state of the LSTM layers 120 to generate an LSTM output, e.g., the LSTM output 122, and to update the current hidden state.

In particular, each LSTM layer includes one or more LSTM memory blocks, with each LSTM memory block including one or more cells that each include an input gate, a forget gate, and an output gate that allow the cell to store previous states for the cell, e.g., for use in generating a current activation. An example configuration of the one or more LSTM layers 120 is described in Alex Graves, *Supervised Sequence Labelling with Recurrent Neural Networks*, volume 385 of Studies in Computational Intelligence. Springer, 2012.

The output layer 130 is configured to receive as input an LSTM output and to generate an output by processing the LSTM output. In particular, as described above, the sequence processing system 100 may be configured to perform any of a variety of language processing tasks, and the output that is generated by the output layer 130 is dependent on the task that the sequence processing system 100 is configured to perform.

For example, when the sequence processing system 100 is configured to perform the word prediction task, the output layer 130 is configured to receive the LSTM output for the last word in the word sequence 102 and generate the respective next word scores for the vocabulary words in the vocabulary of words.

As another example, when the sequence processing system 100 is configured to perform the sentence topic prediction task, the output layer 130 is configured to receive the LSTM output for the last word in the sequence and generate the respective next topic scores for the topics in the predetermined set of topics.

As another example, when the sequence processing system 100 is configured to perform the next sentence selection task, the output layer 130 is configured to receive an LSTM output for a given word in the sequence and to generate a respective score for each vocabulary word in the vocabulary of words. The respective score for each vocabulary word represents a likelihood that the vocabulary word is the word that immediately follows the given word.

In this example, to generate the next sentence score when the candidate sequence that is included in the word sequence 102 includes N words, the sequence processing system 100 determines, for each of the last N words in the word sequence 102, the score generated by the output layer 130 by processing the LSTM output for the word preceding the word in the word sequence 102 and combines the scores generated by the output layer 130 for each of the last N words to generate a combined score for the last N words. The sequence processing system 100 then determines the next sentence score for the candidate sentence from the combined score, e.g., by normalizing the combined score.

In some implementations, when the sequence processing system 100 is configured to perform the next sentence selection task and rather than process multiple word sequences that each include the current sequence followed by a different candidate sequence, the sequence processing system 100 processes the current sequence to determine an LSTM output and internal state for the last word in the current sequence. For each candidate sequence in the set, the sequence processing system 100 then initializes the internal state of the LSTM layers 120 to be the internal state for the last word in the current sequence, and processes the candidate sequence in accordance with the initialized internal state. The sequence processing system 100 therefore reduces the amount of computation necessary to generate next sentence scores for each candidate sequence by processing the current sequence only one time and using the results of that processing to seed the processing of each of the candidate sequences.

Figure 2:
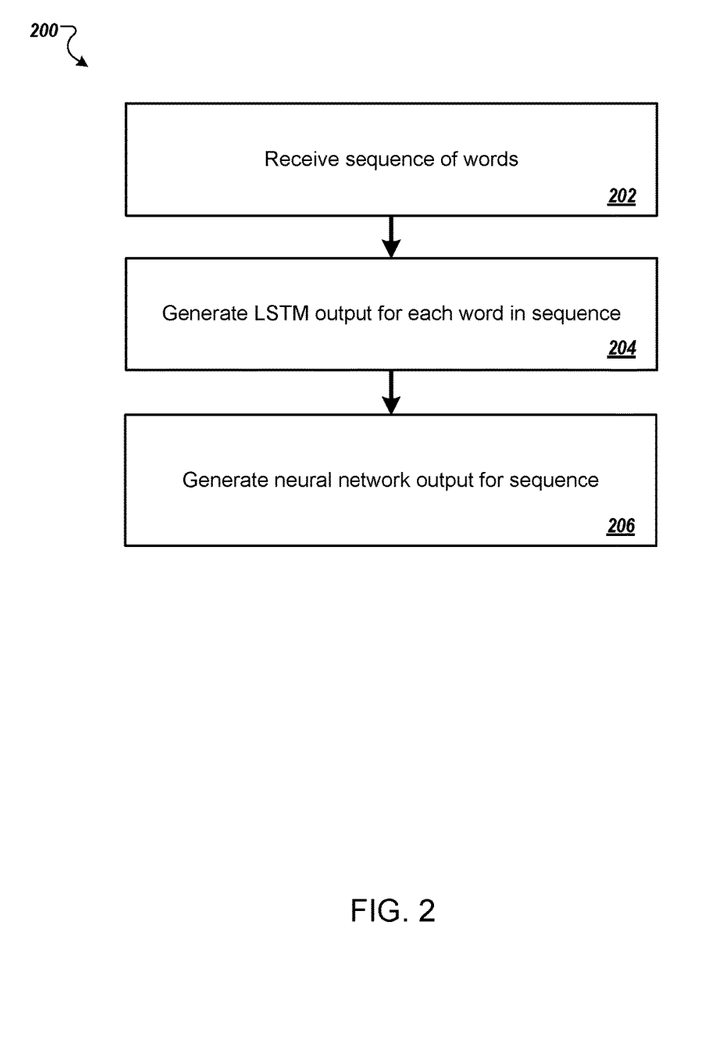
FIG. 2 is a flow diagram of an example process for generating a neural network output for a word sequence.

FIG. 2 is a flow diagram of an example process 200 for generating a neural network output for an input word sequence. For convenience, the process 200 will be described as being performed by a system of one or more computers located in one or more locations. For example, a sequence processing system, e.g., the sequence processing system 100 of FIG. 1, appropriately programmed in accordance with this specification, can perform the process 200.

The system receives a word sequence that includes multiple words arranged according to a particular order (step 202). For example, the word sequence can be a sentence or a paragraph or other sequence that includes multiple sentences.

The system generates a respective LSTM output for each word in the sequence (step 204). Generally, for each word in the sequence, the system determines a topic vector and generates a combined input using the topic vector and the word. The system processes the combined inputs through the one or more LSTM layers to generate the LSTM output for the corresponding word. Generating an LSTM output is described in more detail below with reference to FIG. 3.

The system generates the neural network output for the word sequence from one or more of the LSTM outputs (step 206). In particular, the system processes one or more of the LSTM outputs through the output layer to generate the neural network output.

Once the neural network output has been generated, the system can provide an output derived from the neural network output for presentation to a user on a user computer, can store the neural network output or the output derived from the neural network output for later use, or can provide the neural network output or the output derived from the neural network output to an external system for use for some other immediate purpose. The output derived from the neural network output can be, for example, a formatted presentation of the scores in the neural network output or a presentation that identifies one or more highest-scoring topics, words, or sentences, depending on the language processing task that the system is configured to perform.

As described above, the kind of output the output layer is configured to generate and which LSTM outputs the output layer is configured to receive depends on the language processing task that the system is configured to perform.

For example, when the system is configured to perform the word prediction task, the output layer is configured to receive the LSTM output for the last word in the word sequence and generate the respective next word scores for the vocabulary words in the vocabulary of words.

As another example, when the system is configured to perform the sentence topic prediction task, the output layer is configured to receive the LSTM output for the last word in the sequence and generate the respective next topic scores for the topics in the predetermined set of topics.

As another example, when the system is configured to perform the next sentence selection task, the output layer is configured to receive an LSTM output for a given word in the sequence and to generate a respective score for each vocabulary word in the vocabulary of words. The respective score for each vocabulary word represents a likelihood that the vocabulary word is the word that immediately follows the given word.

Figure 3:
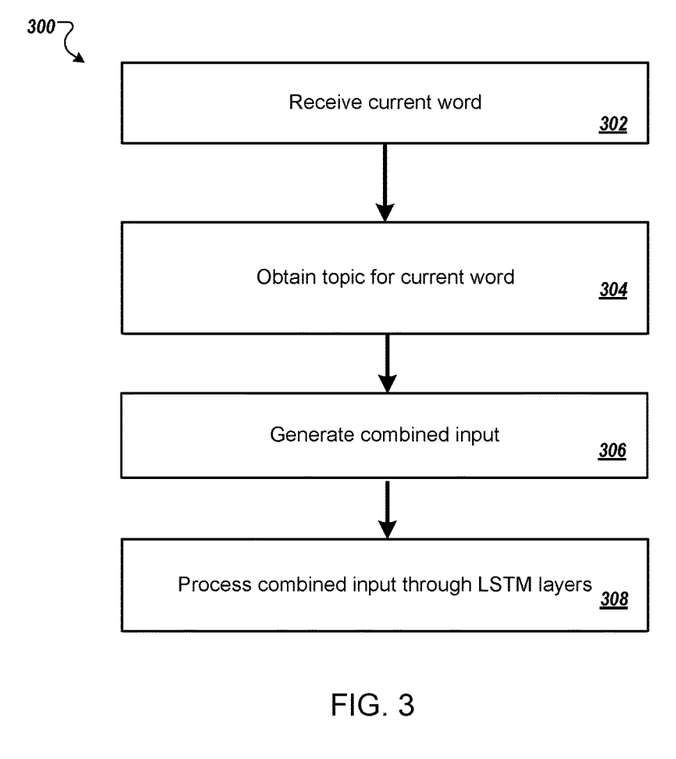
FIG. 3 is a flow diagram of an example process for generating an LSTM output for a word in a word sequence.

FIG. 3 is a flow diagram of an example process 300 for generating an LSTM output for a current word in a word sequence. For convenience, the process 300 will be described as being performed by a system of one or more computers located in one or more locations. For example, a sequence processing system, e.g., the sequence processing system 100 of FIG. 1, appropriately programmed in accordance with this specification, can perform the process 300.

The system receives the current word in the text sequence (step 302).

The system obtains a topic vector for the current word in the text sequence (step 304).

In some implementations, the topic vector for each word in the sequence is generated by an external system and received by the system.

In some other implementations, the system receives a topic for the word sequence, i.e., a word or phrase characterizing the subject of the word sequence, and maps the topic to a topic vector that is a numeric representation of the topic. The system then uses the topic vector as the topic vector for all of the words in the sequence. For example, the topics may have been generated from the word sequence using a hierarchical topic model.

In some other implementations, the sequence includes multiple sentences and the system receives a respective topic for each of the sentences, with the topic for a given sentence being a word or phrase characterizing the subject of the sentence. The system then maps each of the topics to a respective topic vector and uses, for each word, the topic vector for the sentence to which the word belongs.

In some other implementations, where the sequence includes multiple sentences the system generates the topic vector for the current word from the LSTM outputs generated for words in previous sentences in the sequence. In particular, in these implementations, the system uses a predetermined placeholder topic vector as the topic vector for the words in the first sentence in the sequence and uses previous LSTM outputs to determine the topic vector for words in the sentences after the first sentence in the sequence.

In some of these implementations, for each sentence that is after the first sentence in the sequence, the system assigns as the topic vector for the sentence the LSTM output for the last word in the sentence immediately before the sentence in the sequence.

In others of these implementations, after generating the LSTM output for the last word in a given sentence that is after the first sentence in the sequence, the system updates a topic vector associated with the words in the given sentence using the LSTM output for the last word in the sentence to generate an updated topic vector. The system then assigns the updated topic vector as the topic vector for the words in the next sentence, i.e., the sentence immediately following the given sentence. Thus, after the last word in a given sentence has been processed, the system updates a current topic vector and uses the updated topic vector as the topic vector for the next sentence.

To update a current topic vector using an LSTM output, the system combines the current topic vector and the LSTM output. For example, the system can compute a weighted sum of the current topic vector and the LSTM output or compute a measure of central tendency of the current topic vector and the LSTM output.

In some of the implementations in which the system generates the topic vector, the system denoises the generated vector before using it as the topic vector using a low-dimensional embedding, e.g., by adding roundoff-based projection.

The system generates a combined input from the current word and the topic vector (step 306). In particular, the system maps the current word to a word vector, i.e., to a numeric representation of the current word, and then combines, e.g., concatenates, the word vector with the topic vector to generate the combined input.

In some implementations, the system maintains a predetermined mapping of each word in a vocabulary of words to a word vector. In some other implementations, the system adjusts the mappings of words to word vectors using backpropagation during the training of the LSTM layers.

The system processes the combined input through the one or more LSTM layers to generate the LSTM output for the current word (step 308). That is, the system processes the combined input through the one or more LSTM layers in accordance with the current hidden state of the LSTM layers to update the hidden state and to generate the LSTM output for the current word.

The processes 200 and 300 can be performed for word sequences for which the desired output, i.e., the neural network output that should be generated by the system for the input sequence, is not known. The system can also perform the processes 200 and 300 on inputs in a set of training data, i.e., a set of inputs for which the output that should be predicted by the system is known, in order to train the system, i.e., to determine trained values for the parameters of the LSTM neural network layers and, optionally, for the mappings of words to word vectors. In particular, the processes 200 and 300 can be performed repeatedly on input sequences selected from a set of training data as part of a conventional machine learning training technique to train the LSTM neural network layers, e.g., a stochastic gradient descent with backpropagation through time training technique.

The above description describes that the neural network layers that receive the combined input and generate outputs that are processed by the output layers are LSTM layers. However, it should be understood that, in some implementations, those layers are a different kind of sequence modeling neural network layers that are configured to receive each combined input and to collectively process the combined input to generate a sequence modeling output that can be processed by the output layers. For example, the sequence modeling layers may be another kind of recurrent neural network layers that maintain a hidden state while processing the combined inputs, e.g., fully recurrent neural network layers or other kinds of gated recurrent neural networks, e.g., gated recurrent units. As another example, the sequence modeling layers may be feedforward neural network layers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
    receiving a first sequence of words arranged according to a first order, wherein the first sequence of words comprises a plurality of sentences of words, the plurality of sentences being in an input order;
    for each word in the first sequence of words, beginning with a first word in the first order:
        determining a topic vector that is associated with the word,
        generating a combined input from the word and the topic vector, and
        processing the combined input through one or more sequence modeling layers to generate a respective sequence modeling output for the word; and
    processing one or more of the respective sequence modeling outputs through an output layer to generate a neural network output for the first sequence of words, wherein, for each word in each sentence after a first sentence in the input order, determining the topic vector that is associated with the word is based, at least in part, on a sequence modeling output for a last word in a sentence immediately before the sentence in the input order.

2. The method of claim 1, wherein the one or more sequence modeling layers are recurrent neural network layers.

3. The method of claim 2, wherein the recurrent neural network layers are long-short term memory (LSTM) neural network layers.

4. The method of claim 1, wherein processing one or more of the respective sequence modeling outputs comprises:
    processing the respective sequence modeling output for a last word in the first sequence of words through the output layer,
        wherein the output layer is configured to receive the respective sequence modeling output for the last word in the first sequence of words and generate a respective next word score for each word in a vocabulary of words, and wherein the respective next word score for each vocabulary word represents a likelihood that the vocabulary word is a word that immediately follows the last word in the first sequence of words in a source text.

5. The method of claim 1, wherein processing one or more of the respective sequence modeling outputs comprises:
processing the respective sequence modeling output for a last word in the first sequence of words through the output layer,
wherein the output layer is configured to receive the respective sequence modeling output for the last word in the first sequence of words and generate a respective next topic score for each topic in a predetermined set of topics, and
wherein the respective next topic score for each topic represents a likelihood that the topic is the topic of a second sequence of words that immediately follows the first sequence of words in a source text.

6. The method of claim 1, wherein processing one or more of the respective sequence modeling outputs comprises:
identifying N ending words that are a last N words in the first sequence of words;
generating N respective next word scores for each of the words of the N ending words by processing a sequence modeling output for each word that precedes each of the N ending words in the first sequence of words using the output layer,
wherein each of the N respective next word scores represents a likelihood that a respective word of the N ending words follows a word that precedes the respective word of the N ending words in the first sequence of words in a source text;
combining the N respective next word scores for each of the words of the N ending words to generate a combined score; and
determining, from the combined score, a next sentence score that represents a likelihood that a sentence made up of the N ending words follows words in the first sequence of words that precede the N ending words in the source text.

7. The method of claim 1, wherein, for each sentence after a first sentence in the input order, a topic vector associated with one or more words in each sentence is the sequence modeling output for a last word, which is in a sentence immediately before each sentence in the input order.

8. The method of claim 1, wherein a topic vector associated with the words in the first sentence in the input order is a placeholder topic vector.

9. The method of claim 1, further comprising, for each of the plurality of sentences:
after generating a sequence modeling output for a last word in a sentence of the plurality of sentences, updating one or more topic vectors associated with one or more words in the sentence using the sequence modeling output for the last word in the sentence to generate one or more updated topic vectors; and
associating the one or more updated topic vectors with one or more words in a next sentence of the plurality of sentences in the input order.

10. The method of claim 9, wherein updating the one or more topic vectors associated with the one or more words in the sentence using the sequence modeling output for the last word in the sentence of the plurality of sentences to generate the one or more updated topic vectors comprises one of:

computing a weighted sum of the one or more topic vectors associated with the one or more words in the sentence and the sequence modeling output for a last word in the sentence, or
computing a measure of central tendency of the one or more topic vectors associated with the one or more words in the sentence and the sequence modeling output for a last word in the sentence.

11. The method of claim 1, wherein generating a combined input from the word and the topic vector comprises:
mapping the word to a word vector, wherein the word vector is a numeric representation of the word; and
concatenating the word vector and the topic vector to generate the combined input.

12. A system comprising one or more computers and one or more storage devices storing instructions that when executed by the one or more computers cause the one or more computers to perform operations comprising:
receiving a first sequence of words arranged according to a first order, wherein the first sequence of words comprises a plurality of sentences of words, the plurality of sentences being in an input order;
for each word in the first sequence of words, beginning with a first word in the first order:
determining a topic vector that is associated with the word,
generating a combined input from the word and the topic vector, and
processing the combined input through one or more sequence modeling layers to generate a respective sequence modeling output for the word; and
processing one or more of the respective sequence modeling outputs through an output layer to generate a neural network output for the first sequence of words,
wherein, for each word in each sentence after a first sentence in the input order, determining the topic vector that is associated with the word is based, at least in part, on a sequence modeling output for a last word in a sentence immediately before the sentence in the input order.

13. The system of claim 12, wherein the one or more sequence modeling layers are recurrent neural network layers.

14. The system of claim 12, wherein generating a combined input from the word and the topic vector comprises:
mapping the word in the first sequence of words to a word vector, wherein the word vector is a numeric representation of the word in the first sequence of words; and
concatenating the word vector and the topic vector to generate the combined input.

15. One or more non-transitory computer storage media storing instructions that when executed by one or more computers cause the one or more computers to perform operations comprising:
receiving a first sequence of words arranged according to a first order, wherein the first sequence of words comprises a plurality of sentences of words, the plurality of sentences being in an input order;
for each word in the first sequence of words, beginning with a first word in the first order:
determining a topic vector that is associated with the word,
generating a combined input from the word and the topic vector, and
processing the combined input through one or more sequence modeling layers to generate a respective sequence modeling output for the word; and processing one or more of the respective sequence modeling outputs through an output layer to generate a neural network output for the first sequence of words, wherein, for each word in each sentence after a first sentence in the input order, determining the topic vector that is associated with the word is based, at least in part, on a sequence modeling output for a last word in a sentence immediately before the sentence in the input order.

\* \* \* \* \*

UNITED STATES PATENT AND TRADEMARK OFFICE
CERTIFICATE OF CORRECTION

Page 1 of 1

PATENT NO. : 10,083,169 B1
APPLICATION NO. : 15/248966
DATED : September 25, 2018
INVENTOR(S) : Ghosh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 37 days.

Signed and Sealed this
Twenty-fifth Day of June, 2019

Andrei Iancu
*Director of the United States Patent and Trademark Office*